United States Patent [19]

Hwang

[11] Patent Number: 5,681,058
[45] Date of Patent: Oct. 28, 1997

[54] ASSEMBLY FOR JOINING A PIPE TO A PIPE FITTING

[76] Inventor: Biing-Yih Hwang, No. 102, Sec. 1, Feng-Lin Rd., Lin-Yuan Hsiang, Kaohsiung County, Taiwan

[21] Appl. No.: 699,907

[22] Filed: Aug. 20, 1996

[51] Int. Cl.⁶ .................................................. F16L 35/00
[52] U.S. Cl. ........................ 285/39; 285/339; 285/353; 285/156; 285/348
[58] Field of Search ............................... 285/339, 341, 285/382.7, 353, 156, 39, 348

[56] References Cited

U.S. PATENT DOCUMENTS

| | | | |
|---|---|---|---|
| 3,972,547 | 8/1976 | Itoya | 285/342 |
| 3,986,730 | 10/1976 | Martelli et al. | 285/353 |
| 4,095,826 | 6/1978 | Borradoru | 285/382.7 |
| 4,256,335 | 3/1981 | Nielsen, Jr. | 285/382.7 |
| 4,647,086 | 3/1987 | Maxwell et al. | 285/382.7 |
| 4,792,160 | 12/1988 | Hwang . | |
| 4,930,816 | 6/1990 | Hwang . | |
| 5,176,409 | 1/1993 | Brooks | 285/353 |
| 5,516,157 | 5/1996 | Williamson | 285/353 |

Primary Examiner—Eric K. Nicholson
Attorney, Agent, or Firm—Bacon & Thomas

[57] ABSTRACT

An assembly for joining a pipe to a pipe fitting includes an anti-leak gasket which is mounted around the pipe and which has a tapered portion with an outer periphery complimentary to and thus fittingly received in a tapered inner wall section of the pipe fitting. An inner threaded ring is mounted around the pipe at a position above the anti-leak gasket and includes threads defined in an outer periphery thereof for threaded engagement with threads defined in the pipe fitting. The inner threaded ring further includes an inclined inner peripheral wall. A C-shaped ring is mounted between the inclined inner peripheral wall of the inner threaded ring and the outer periphery of the pipe. The C-shaped ring includes a plurality of first protrusions projecting from an inner periphery thereof and received in an annular groove of the pipe and a plurality of second protrusions projecting from an outer periphery thereof. The outer periphery of each second protrusion of the C-shaped ring is a beveled surface for fittingly engaging with the inclined inner peripheral wall of the inner threaded ring. The C-shaped ring frictionally clamps the pipe upon rotation of the inner threaded ring.

2 Claims, 3 Drawing Sheets

ASSEMBLY FOR JOINING A PIPE TO A PIPE FITTING

BACKGROUND OF THE INVENTION

1. Field of the Invention

The present invention relates to an assembly for joining a pipe to a pipe fitting.

2. Description of the Related Art

U.S. Pat. No. 4,792,160 to Applicant discloses a structure for joining a pipe to a pipe fitting, wherein a male-threaded ring is threadably received completely within a distal female-threaded portion of the pipe fitting, and a metal ring is fittingly mounted around the pipe and inside of an intermediate portion of the pipe fitting. The metal ring is used to press against a plurality of anti-leak gaskets to expand the anti-leak gaskets between the pipe and the intermediate portion of the pipe fitting, thereby uniting and sealing the pipe to the pipe fitting. U.S. Pat. No. 4,930,816 to Applicant also discloses a device for joining a pipe to a pipe fitting, wherein an inner threaded ring is threadably received completely within a larger diameter section at an outer end of the pipe fitting, and an anti-leak gasket is expanded radially between an inner surface of the pipe fitting and an outer surface of the pipe. In addition, a C-shaped ring is fixed in a circumferential groove defined in the pipe. The present invention is intended to provide an improved design in this regard such that the inner threaded ring can be processed more easily and the C-shaped ring can be positioned more reliably.

SUMMARY OF THE INVENTION

The present invention includes an assembly for joining a pipe to a pipe fitting, wherein the pipe includes an annular groove defined in an outer periphery thereof, and wherein the pipe fitting includes at least one passage hole. The passage hole has a larger diameter section at an outer end thereof, a smaller diameter section at an inner end thereof, and a tapered inner wall section interconnecting the larger diameter section and the smaller diameter section. An inner periphery defining the larger diameter section has first threads defined therein. A shoulder is formed on an inner periphery defining the smaller diameter section.

The assembly of the present invention comprises an anti-leak gasket mounted around the pipe and including a sloped portion which has an outer periphery complimentary to and thus fittingly received in the tapered inner wall section of the pipe fitting. An inner threaded ring is mounted around the pipe at a position above the anti-leak gasket and has a first end and a second end. The inner threaded ring includes second threads defined in an outer periphery thereof for threaded engagement with the first threads of the pipe fitting. The inner threaded ring further includes at least two notches defined in the first end thereof and an inclined inner peripheral wall adjacent to the second end thereof, the inner peripheral wall capering toward the second end.

A C-shaped ring is mounted between the inclined inner peripheral wall of the inner threaded ring and the outer periphery of the pipe. The C-shaped ring includes a plurality of first protrusions projecting from an inner periphery thereof and received in the annular groove of the pipe and a plurality of second protrusions projecting from an outer periphery thereof. The outer periphery of the C-shaped ring is a beveled surface for fittingly engaging with the inclined inner peripheral wall of the inner threaded ring. The C-shaped ring frictionally clamps the pipe under rotation of the inner threaded ring in a direction.

Preferably, a gasket is mounted between the anti-leak gasket and the C-shaped ring to prevent damage to the anti-leak gasket due to rotation of the C-shaped ring.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
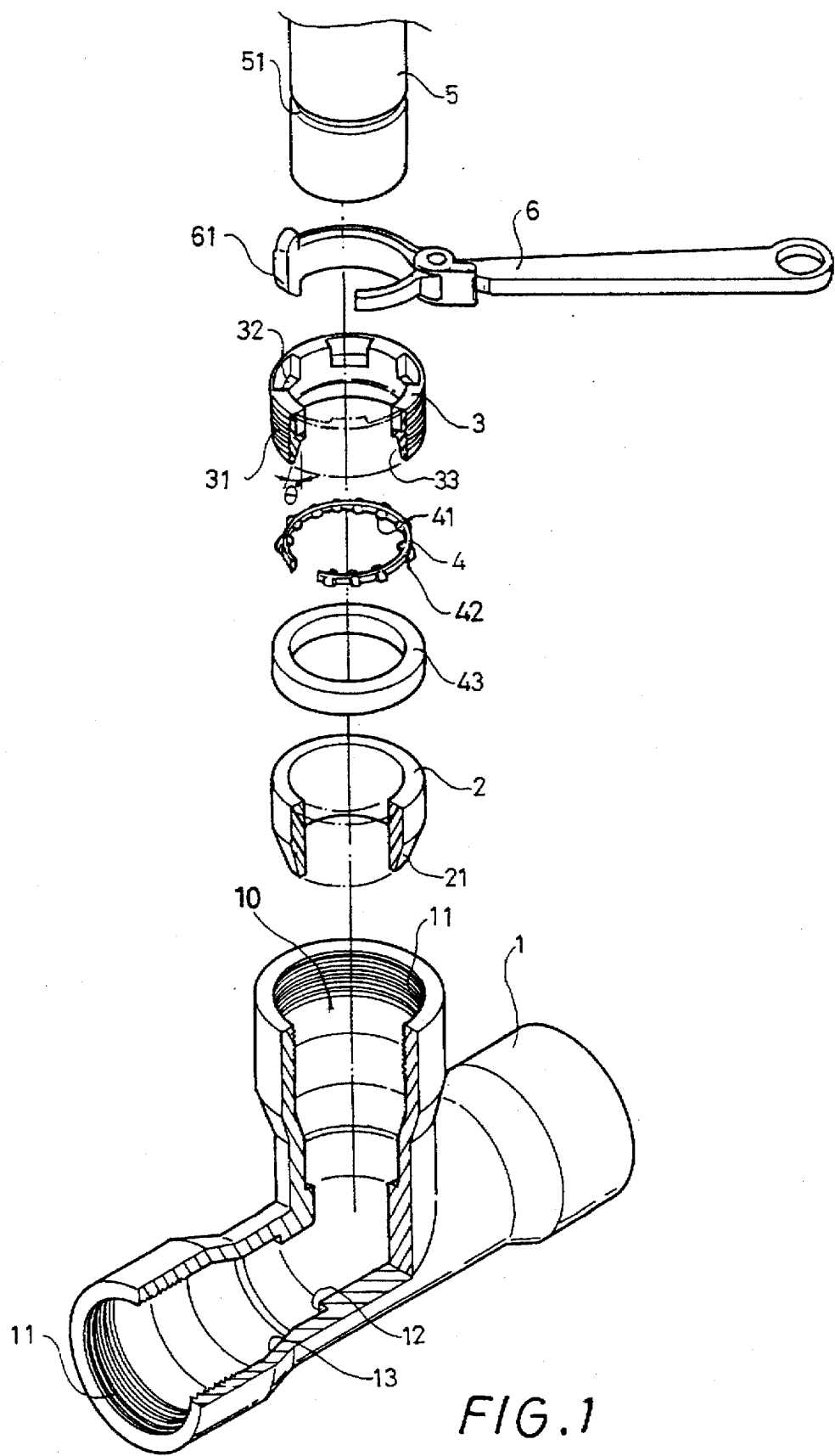
FIG. 1 is an exploded perspective view of an assembly for joining a pipe to a pipe fitting in accordance with the present invention.
Figure 2:
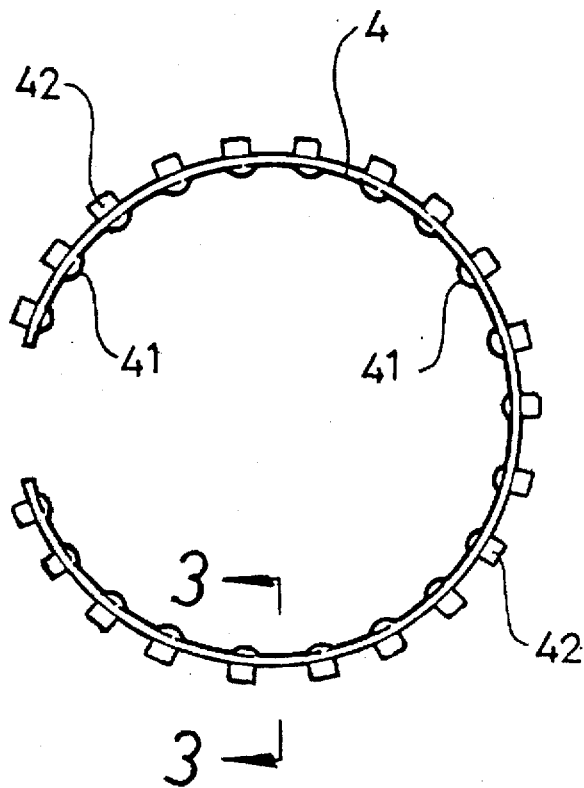
FIG. 2 is a top plan view of a C-shaped ring in accordance with the present invention.
Figure 3:
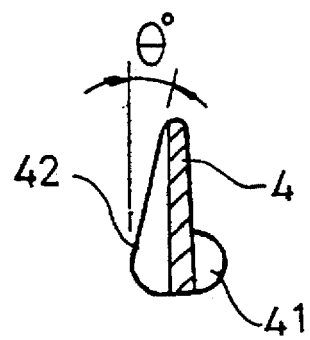
FIG. 3 is a cross-sectional view taken along line 3—3 in FIG. 2.

Referring to the drawings and initially to FIGS. 1 to 3, an assembly for joining a pipe 5 to a pipe fitting 1 includes an anti-leak gasket 2, a C-shaped ring 4, and an inner threaded ring 3. The pipe fitting may be an elbow, a tee, etc. The pipe fitting 1 in this embodiment is a tee and includes three passage holes 10. Each passage hole 10 includes a larger diameter section at an outer end thereof, a smaller diameter section at an inner end thereof, and a tapered inner wall section 13 interconnecting the larger diameter section and the smaller diameter section. Threads 11 are defined in an inner periphery defining the larger diameter section. In addition, a shoulder 12 is formed on an inner periphery defining the smaller diameter section.

The anti-leak gasket 2 is made of rubber or similar material and mounted around the pipe 5. The anti-leak gasket 2 includes a tapered portion 21 which has an outer periphery complimentary to and engageable within the tapered inner wall section 13 of the pipe fitting 1.

Figure 4:
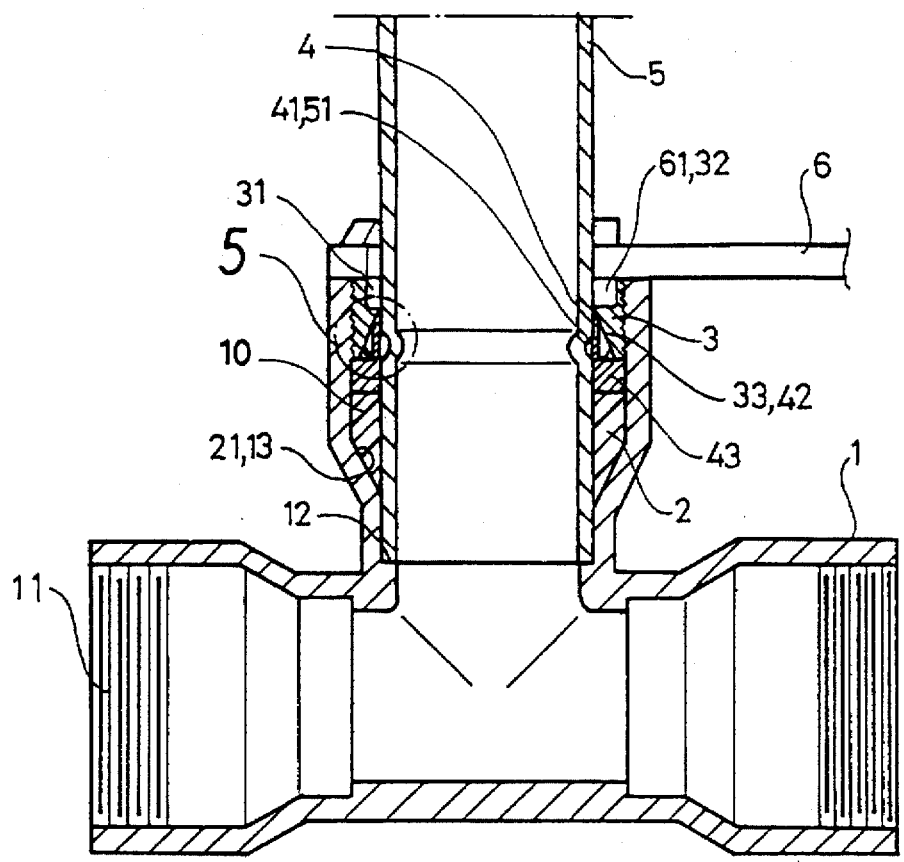
FIG. 4 is a cross-sectional view of the assembly and the joining pipe and pipe fitting.

The inner threaded ring 3 is made of metal and mounted around the pipe 5 at a position above the anti-leak gasket 2 (see FIG. 4). The inner threaded ring 3 includes threads 31 defined in an outer periphery thereof for threaded engagement with the threads 11 of the pipe fitting. The inner threaded ring 3 further includes at least two notches 32 defined in a first end thereof for receiving teeth 61 of a spanner 6, which will be described in detail later. In addition, the inner threaded ring 3 further includes an inclined inner peripheral wall 33 adjacent to a second end thereof. The inner peripheral wall 33 flares outwardly toward the second end at an angle θ.

As shown in FIGS. 2 and 3, the C-shaped ring 4 includes a plurality of first protrusions 41 projecting from an inner periphery thereof and a plurality of second protrusions 42 projecting from an outer periphery thereof. The outer periphery is contoured as a beveled surface (see FIG. 3) which inclines at an angle θ for fittingly engaging with the inner peripheral wall 33 of the inner threaded ring 3.

Figure 5:
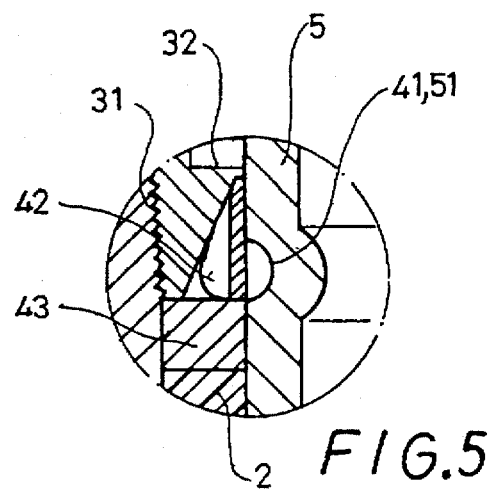
FIG. 5 is an enlarged view of a circle "5" in FIG. 4.

Turning to FIGS. 4 and 5, in assembly, the anti-leak gasket 2, the C-shaped ring 4, and the inner threaded ring 3 are mounted around the pipe 5 before insertion of the pipe 5 into the perpendicular passage hole 10 of the pipe fitting 1. The spanner 6 is applied to engage and rotate the inner threaded ring 3, the teeth 61 are received in the notches 32.

Rotation of the inner threaded ring 3 causes the C-shaped ring 4 to tightly clamp an outer periphery of the pipe 5, wherein the first protrusions 41 of the C-shaped ring 4 are received in an annular groove 51 (see FIG. 1) defined in the outer periphery of the pipe 5 and provide an excellent frictional engagement to tightly clamp the pipe 5. A gasket 43 may be mounted between the anti-leak gasket 2 and the C-shaped ring 3 to prevent damage to the anti-leak gasket 2 due to rotation of the C-shaped ring 4. It is appreciated that the inner threaded ring 3 presses against the anti-leak gasket 2 during rotation thereof to expand the anti-leak gasket 2 between the inner periphery of the pipe fitting 1 and the outer periphery of the pipe 5, thereby providing a reliable joining therebetween.

As the C-shaped ring 4 includes first and second protrusions 41 and 42, the pipe 5 can be more reliably clamped. In addition, the notches 32 of the inner threaded ring 3 can be in the form of counterbores such that tools for taping the inner threaded ring 3 may not be easily broken, i.e., the inner threaded ring 5 can be processed more easily.

Although the invention has been explained in relation to its preferred embodiment, it is to be understood that many other possible modifications and variations can be made without departing from the spirit and scope of the invention as hereinafter claimed.

What is claimed is:

1. An assembly for joining a pipe to a pipe fitting, wherein the pipe includes an annular groove defined in an outer periphery thereof, and the pipe fitting includes at least one passage hole having a larger diameter section at an outer end thereof, a smaller diameter section at an inner end thereof, and a tapered inner wall section interconnecting the larger diameter section and the smaller diameter section, an inner periphery defining the larger diameter section having first threads defined therein, and a shoulder being formed on an inner periphery defining the smaller diameter section, the assembly comprising:

an anti-leak gasket for mounting around the pipe and including a tapered portion which has an outer periphery complimentary to and engageable within the tapered inner wall section of the pipe fitting;

an inner threaded ring for mounting around the pipe at a position above the anti-lea gasket and having a first end and a second end, the inner threaded ring including second threads defined in an outer periphery thereof for threaded engagement with the first threads of the pipe fitting, the inner threaded ring further including at least two notches defined in the first end thereof and an inclined inner peripheral wall adjacent to the second end thereof, the inner peripheral wall flaring outwardly towards the second end; and a C-shaped ring for mounting between the inclined inner peripheral wall of the inner threaded ring and the outer periphery of the pipe, the C-shaped ring including a plurality of first protrusions projecting from an inner periphery thereof for engagement within the annular groove of the pipe and a plurality of second protrusions projecting from an outer periphery thereof, the outer periphery of each second protrusion of the C-shaped ring defining a beveled surface for corresponding engagement with the inclined inner peripheral wall of the inner threaded ring; and wherein the C-shaped ring frictionally clamps the pipe upon rotation of the inner threaded ring.

2. The assembly as claimed in claim 1, further comprising a gasket for mounting between the anti-leak gasket and the C-shaped ring.

* * * * *